(12) United States Patent
Sims et al.

(10) Patent No.: US 10,721,246 B2
(45) Date of Patent: Jul. 21, 2020

(54) SYSTEM FOR ACROSS RAIL SILO SYSTEM INTEGRATION AND LOGIC REPOSITORY

(71) Applicant: BANK OF AMERICA CORPORATION, Charlotte, NC (US)

(72) Inventors: Scott Anderson Sims, Tega Cay, SC (US); Kolt Arthur Bell, Charlotte, NC (US); Michael Joseph Carroll, Orland Park, IL (US); Andrew Dongho Kim, Glendale, AZ (US); Elliot Piatetsky, New York, NY (US); Stephen M. Schneeweis, Hockessin, DE (US); Michael E. Toth, Charlotte, NC (US); Craig D. Widmann, Chandler, AZ (US); Dharmender Kumar Satija, Rye Brook, NY (US); Sai Kishan Alapati, Princeton Junction, NJ (US); Hitesh J. Shah, Seattle, WA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 255 days.

(21) Appl. No.: 15/798,155

(22) Filed: Oct. 30, 2017

(65) Prior Publication Data
US 2019/0132336 A1 May 2, 2019

(51) Int. Cl.
*H04L 29/06* (2006.01)

(52) U.S. Cl.
CPC ...... *H04L 63/1416* (2013.01); *H04L 63/1425* (2013.01); *H04L 63/1441* (2013.01)

(58) Field of Classification Search
CPC ............ H04L 63/1425; H04L 63/1433; H04L 63/1416; H04L 63/1441

USPC ......................................................... 726/23
See application file for complete search history.

(56) References Cited

U.S. PATENT DOCUMENTS

| | | |
|---|---|---|
| 6,882,988 B2 | 4/2005 | Subbu et al. |
| 7,266,839 B2 | 9/2007 | Bowers et al. |
| 7,603,709 B2 | 10/2009 | Lewis et al. |
| 8,166,553 B2 | 4/2012 | Kubota |
| 8,201,256 B2 | 6/2012 | Patanella |
| 8,239,677 B2 | 8/2012 | Colson |
| 8,683,591 B2 | 3/2014 | Wittenschlaeger |
| 8,763,127 B2 | 6/2014 | Yao et al. |

(Continued)

OTHER PUBLICATIONS

NPL Search Results (Year: 2020).*
Jason Fitzpatrick "Why does RAM have to be volatile?", 2014, 4 pages (Year: 2014).

*Primary Examiner* — Syed A Zaidi
(74) *Attorney, Agent, or Firm* — Michael A. Springs; Moore & Van Allen PLLC; Nicholas C. Russell

(57) ABSTRACT

Systems, computer program products, and methods are described herein for the creation of an exposure identification and distribution system for across silo channel integration. In this way, the system allows team integration of data across rails and silos for exposure identification. As such, the system generates a centralized repository for data and a communication linkage across the various systems used for identifying exposure and manipulated for linkage via a specific taxonomy overlay. Furthermore the system also includes logic that, when identification of a potential exposure indicate occurs, the system may communicate via distribution over the rails for integration and sharing for cross entity exposure identification.

20 Claims, 6 Drawing Sheets

(56) References Cited

U.S. PATENT DOCUMENTS

| | | |
|---|---|---|
| 9,798,883 B1 | 10/2017 | Gil et al. |
| 2002/0112190 A1 | 8/2002 | Miyagawa et al. |
| 2002/0133603 A1 | 9/2002 | Mitomo et al. |
| 2002/0133606 A1* | 9/2002 | Mitomo ................. H04L 41/28 709/229 |
| 2002/0135610 A1 | 9/2002 | Ootani et al. |
| 2003/0023655 A1 | 1/2003 | Sokolov et al. |
| 2003/0033541 A1 | 2/2003 | Edmark et al. |
| 2003/0046583 A1 | 3/2003 | Goldman et al. |
| 2003/0051026 A1 | 3/2003 | Carter et al. |
| 2003/0084318 A1 | 5/2003 | Schertz |
| 2003/0084340 A1 | 5/2003 | Schertz et al. |
| 2003/0084349 A1 | 5/2003 | Friedrichs et al. |
| 2003/0088680 A1 | 5/2003 | Nachenberg et al. |
| 2003/0110396 A1 | 6/2003 | Lewis et al. |
| 2003/0153299 A1* | 8/2003 | Perfit ..................... H04M 15/43 455/410 |
| 2003/0172291 A1 | 9/2003 | Judge et al. |
| 2003/0187977 A1 | 10/2003 | Cranor et al. |
| 2003/0221123 A1 | 11/2003 | Beavers |
| 2004/0230677 A1 | 11/2004 | OHara |
| 2006/0129382 A1* | 6/2006 | Anand ................. G06F 21/552 704/9 |
| 2006/0294373 A1* | 12/2006 | Stamos ............... H04L 63/0823 713/165 |
| 2007/0143851 A1* | 6/2007 | Nicodemus .......... H04L 63/105 726/25 |
| 2007/0169194 A1 | 7/2007 | Church et al. |
| 2009/0326731 A1* | 12/2009 | Bowdry ................. G01D 4/004 700/297 |
| 2012/0260331 A1* | 10/2012 | Aaron ..................... H04L 63/02 726/11 |
| 2013/0097658 A1* | 4/2013 | Cooper ............... H04L 63/0209 726/1 |
| 2013/0309154 A1* | 11/2013 | Call ....................... G08B 21/12 423/210 |
| 2015/0074258 A1* | 3/2015 | Ferreira ............. H04L 43/0876 709/224 |
| 2015/0106260 A1* | 4/2015 | Andrews ........... G06Q 20/4016 705/39 |
| 2015/0128274 A1* | 5/2015 | Giokas ................ H04L 63/1416 726/23 |
| 2015/0172321 A1 | 6/2015 | Kirti et al. |
| 2015/0229625 A1 | 8/2015 | Grigg et al. |
| 2015/0302411 A1 | 10/2015 | Bondesen et al. |
| 2015/0319185 A1 | 11/2015 | Kirti et al. |
| 2016/0112443 A1* | 4/2016 | Grossman ........... H04L 63/1416 726/23 |
| 2016/0191476 A1 | 6/2016 | Schutz et al. |
| 2016/0308890 A1* | 10/2016 | Weilbacher ......... H04L 63/1416 |
| 2017/0006019 A1 | 1/2017 | Addala et al. |
| 2017/0093829 A1 | 3/2017 | Gitlin et al. |
| 2017/0289187 A1 | 10/2017 | Noel et al. |
| 2018/0063182 A1 | 3/2018 | Jones et al. |
| 2018/0124082 A1 | 5/2018 | Siadati et al. |
| 2018/0219914 A1 | 8/2018 | Reith et al. |
| 2018/0247218 A1 | 8/2018 | Fiumara et al. |
| 2018/0248895 A1 | 8/2018 | Watson et al. |
| 2019/0116193 A1 | 4/2019 | Wang et al. |
| 2019/0259033 A1 | 8/2019 | Reddy et al. |

* cited by examiner

SYSTEM FOR ACROSS RAIL SILO SYSTEM INTEGRATION AND LOGIC REPOSITORY

BACKGROUND

Traditional methods of data analysis have long been used to detect intrusive behavior in a technology environment. This often includes identifying instances or incidents involving repeated transgressions using same or similar methods. Typically, every organization has multiple independent departments that work together towards a common goal of the organization. Each department integrates its technological infrastructure with intrusion detection systems that are capable of identifying potential intrusive behavior associated with that department. However, in an organization where data is shared and utilized across these departments, there is a need for a system to identify

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

The invention creates a repository for exposure strategy teams for collective decision making on exposure identification and for distribution and sharing of data across team rails. Currently the various exposure strategy teams are in individual silos, such that they do not communicate across teams to identify exposure. Each team carries out their exposure prevention strategy using their own systems and software that do not interact with each other. Exposure strategy teams such as account takeover teams, digital authentication teams, transactional strategy teams, and the like each look at specific target points and indicators for exposure in each individual space using their own systems. The invention system allows for these teams to integrate data across rails and silos for exposure identification. The data may be added in real-time or near real-time using analytics. The data may be specific events and be linked via a specific taxonomy overlay. For example, while one team may see one or more indicators of exposure from an event, the event may not trigger a exposure identification/response/alert. However, the system may link and share data across the rails for the various teams that when the indicators are combined in an aggregate with other team indicators, exposure decision could be triggered. Furthermore the system also includes logic that, when identification of a potential indicate occurs, the system may communicate that indicator to other teams for the integration and sharing of potential data for cross entity exposure identification. Finally, the system is designed as a centralized repository in a hub-and-spoke manner. However, the system may be able to become un-centralized if necessary to communicate with a single team or node. In this way, the repository allows for data storage and access across teams, a logic to push out data for review, and an aggregation of events for exposure identification. The repository may exist across entities such that accounts from different banks are also being monitored.

In some embodiments, the invention provides a system, method, and computer program product for across silo system integration, the invention comprising: identifying one or more devices across an entity network, wherein the one or more devices are associated with exposure strategy users identifying exposure events within the entity; generating a communication linkage with the one or more devices and a centralized repository for exposure event storage; receiving one or more exposure events from the one or more devices via the communication linkage and storing the one or more exposure events in a centralized repository; aggregating the one or more exposure events received; performing a taxonomy overlay of the aggregated one or more exposure events, wherein the taxonomy overlay identifies a combination of one or more exposure events triggering a mitigation response; and transmitting via single node communication the combination of one or more exposure events from the mitigation response.

In some embodiments, generating a communication linkage with the one or more devices and a centralized repository for exposure event storage further comprises generating communication linkage with the one or more devices and maintain single node communication compatibility.

In some embodiments, receiving one or more exposure events from the one or more devices via the communication linkage further comprises integrating into applications on the one or more devices and extracting identified exposure events.

In some embodiments, the exposure events comprise one or more intrusions associated with a department within the entity, wherein the one or more intrusions include benign intrusions or require a mitigation response based on a review.

In some embodiments, the taxonomy overlay identifies a combination of one or more exposure events triggering a mitigation response further comprises combining one or more exposure events that are benign to generate a combination of multiple exposure events that trigger, in combination, the mitigation response requirement.

In some embodiments, transmitting via single node communication the combination of one or more exposure events from the mitigation response further comprises communicating directly to specific devices associated with exposure strategy users for performing the mitigation response via a single node communication while maintaining the centralized repository and the communication linkage with the one or more devices across the entity.

In some embodiments, transmitting via single node communication the combination of one or more exposure events from the mitigation response further comprises triggering logic communication to the device associated with the one or more exposure events identified in the combination.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
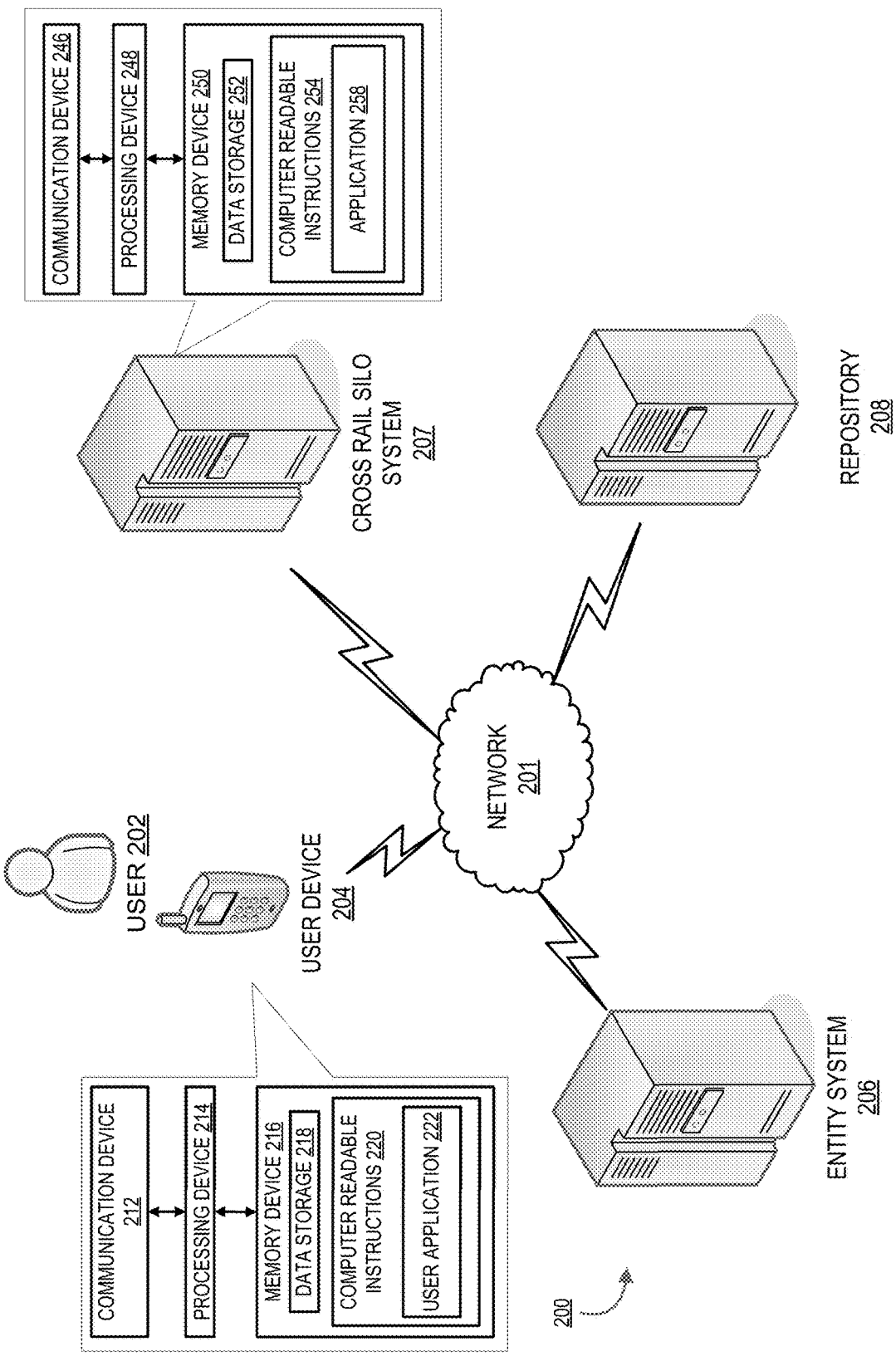
Figure 2A:
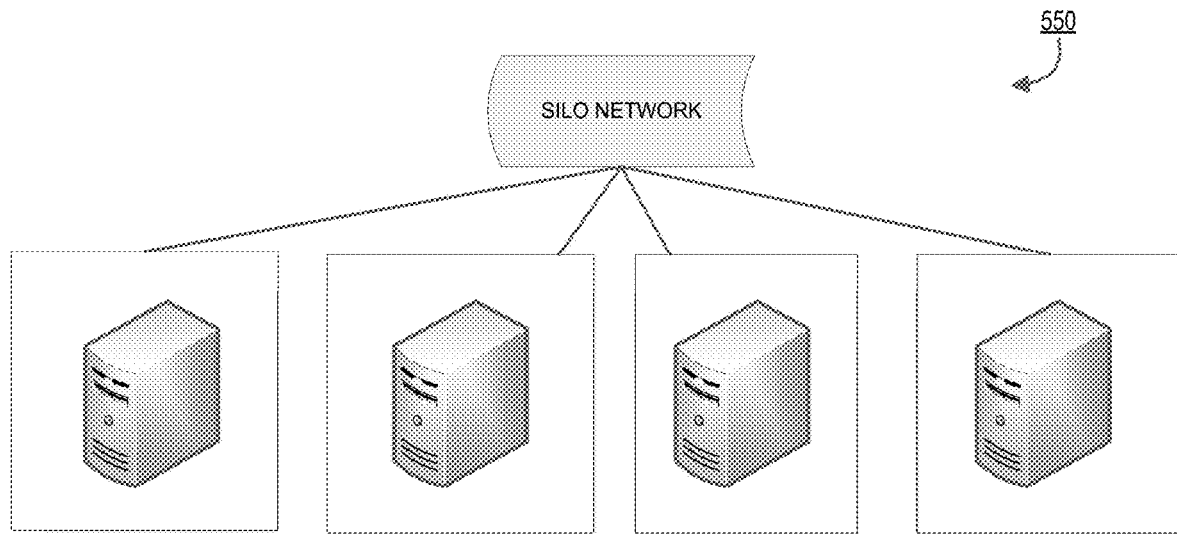
Figure 2B:
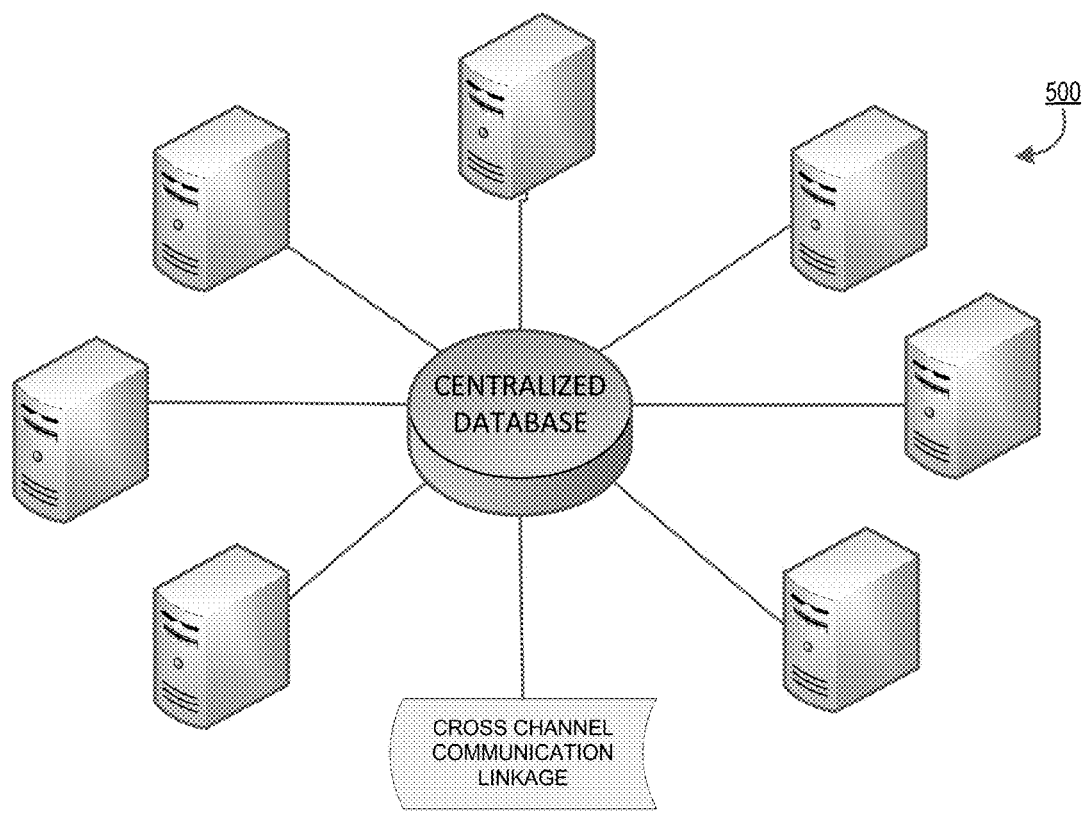
Figure 3:
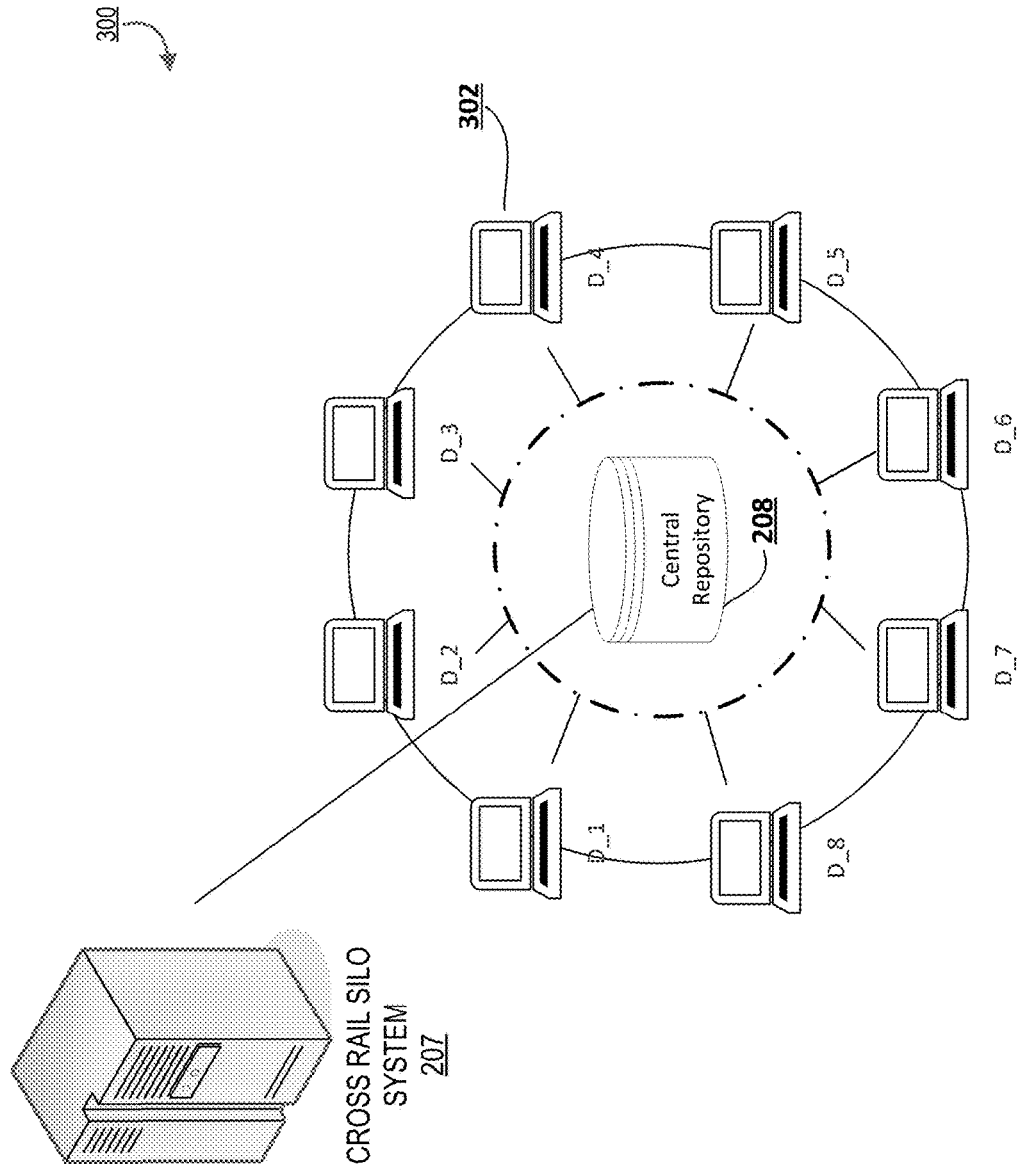
Figure 4:
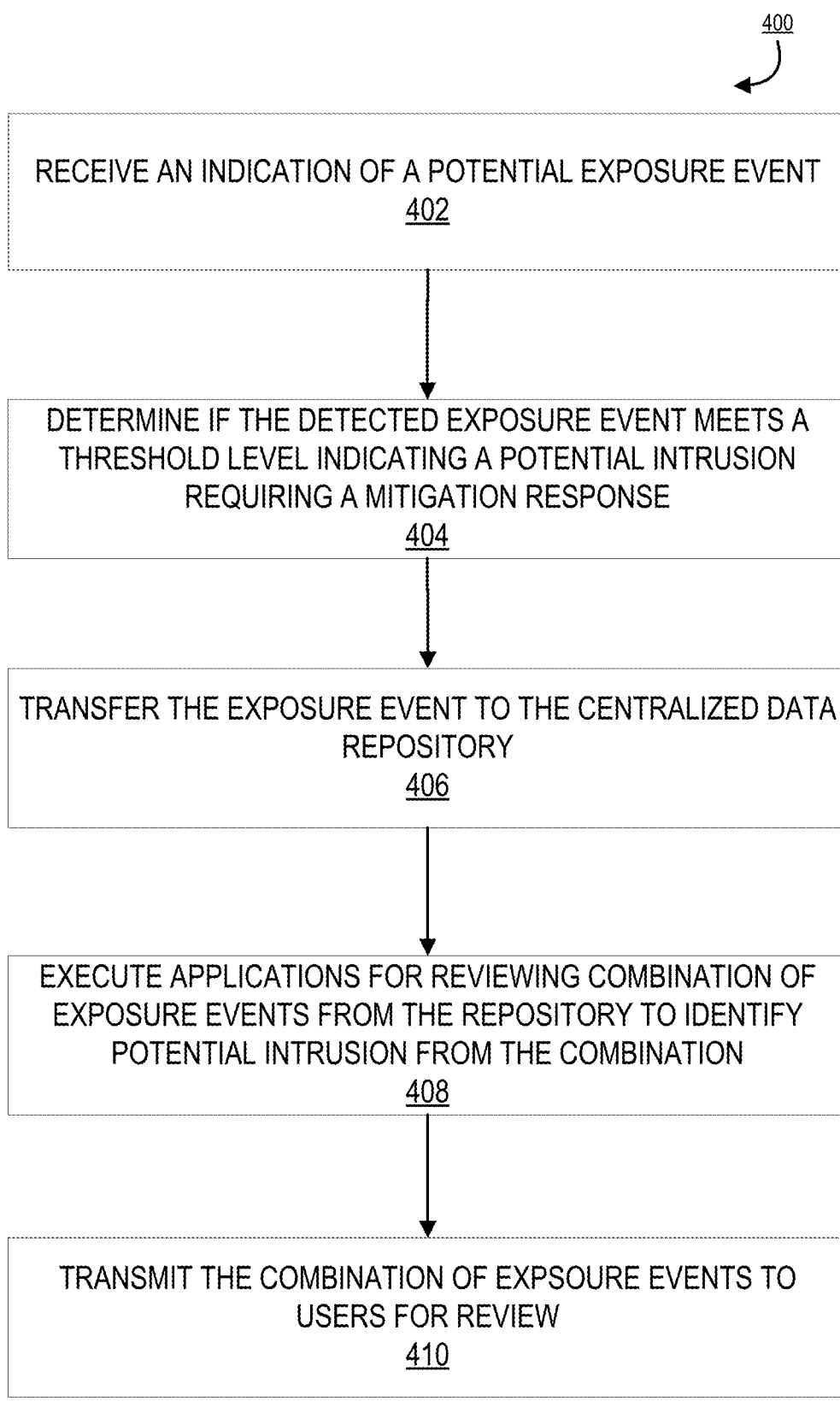
Figure 5:
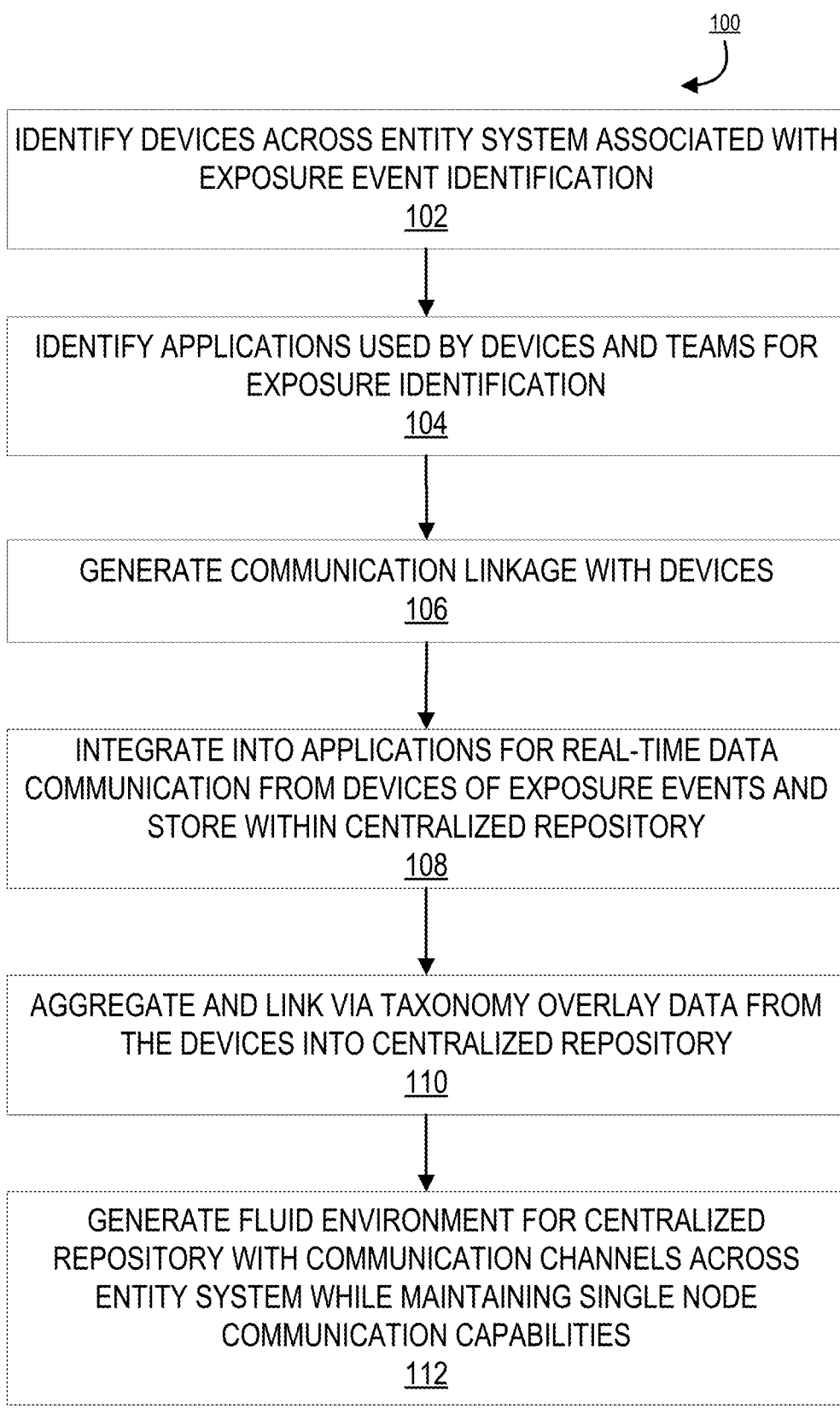
Figure 6:
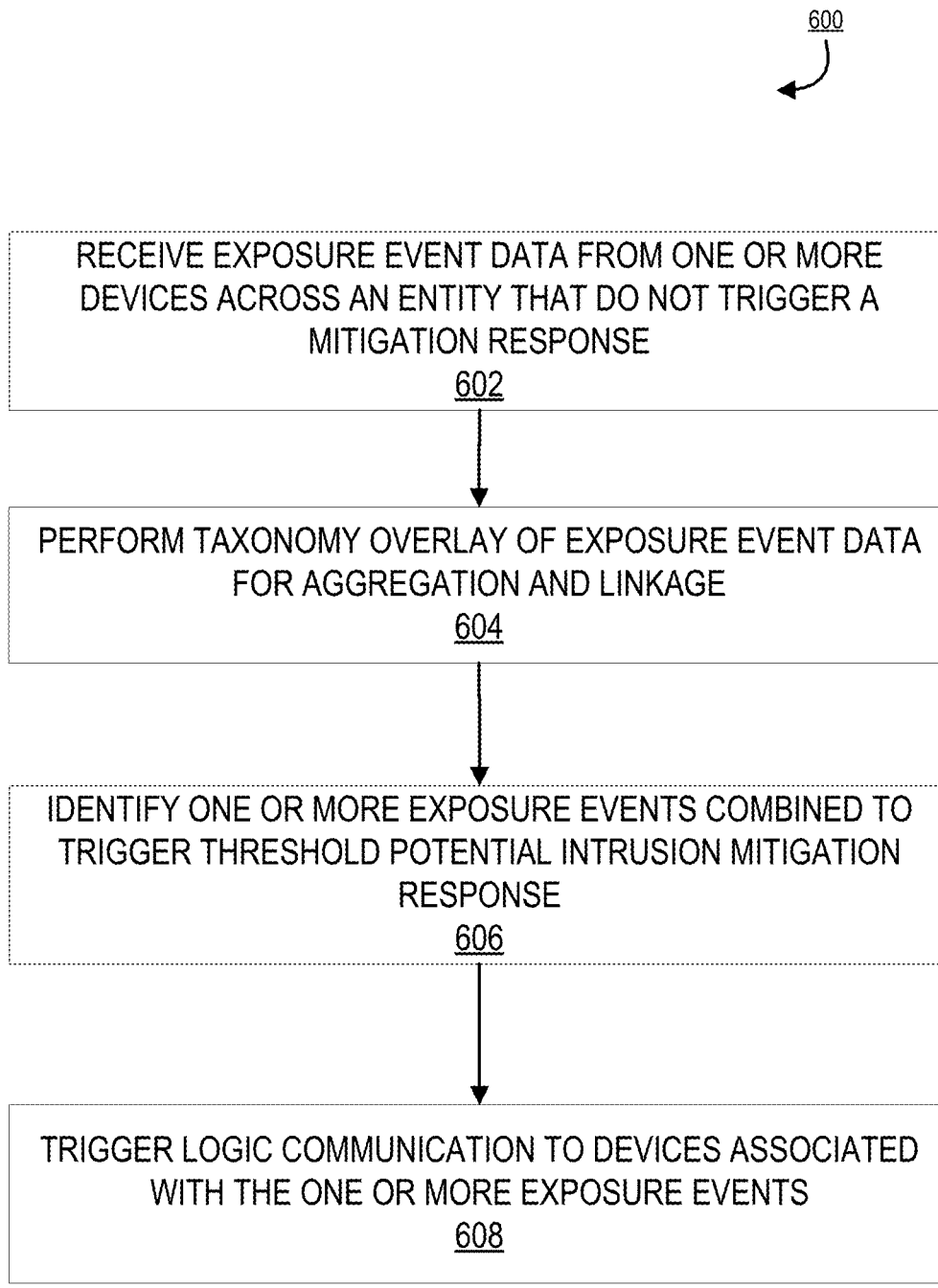

Having thus described embodiments of the invention in general terms, reference will now be made the accompanying drawings, wherein:

FIG. 1 presents an across rail silo system integration and logic repository system environment, in accordance with an embodiment of the invention;

FIG. 2A illustrates a silo network environment, in accordance with one embodiment of the present invention;

FIG. 2B illustrates an across rail silo environment, in accordance with one embodiment of the present invention;

FIG. 3 illustrates an intrusion detection system model, in accordance with an embodiment of the invention;

FIG. 4 illustrates a process flow for a system for aggregating user event record cross multiple platforms in a technology environment, in accordance with an embodiment of the invention;

FIG. 5 illustrates a process flow for generation of the across rail silo system integration for exposure event identification, in accordance with an embodiment of the invention; and FIG. 6 illustrates a process flow illustrating taxonomy overlay of one or more exposure events, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

In some embodiments, an "entity" may be a financial institution or third party merchant. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself.

FIG. 1 illustrates an across rail silo system integration and logic repository system environment 200, in accordance with an embodiment of the invention. FIG. 1 provides the system environment 200 for which the distributive network system with specialized data feeds associated with resource distribution. FIG. 1 provides a unique system that includes specialized servers and system communicably linked across a distributive network of nodes required to perform the functions of real-time validation authorization for resource distribution.

As illustrated in FIG. 1, the repository 208 is operatively coupled, via a network 201 to the user device 204, cross rail silo system 207, and to the entity system 206. In this way, the repository 208 can send information to and receive information from the user device 204, cross rail silo system 207, and the entity system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is one or more individuals within an entity, such as employees, agents, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the entity system 206, the repository 208, and the cross rail silo system 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to set up marker codes and communicate with the entity system 206.

As further illustrated in FIG. 1, the cross rail silo system 207 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the repository 208, the entity system 206, and the user device 204. As such, the communication device 246 generally comprises a modem, server, or other device for communicating with other devices on the network 201.

As further illustrated in FIG. 1, the cross rail silo system 207 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the cross rail silo system 207 the memory device 250 stores an application 258. Furthermore, the cross rail silo system 207, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more repository 208, cross rail silo system 207, and/or user device 204.

As illustrated in FIG. 1, the entity system 206 is connected to the repository 208, user device 204, and cross rail silo system 207. The entity system 206 has the same or similar components as described above with respect to the user device 204 and the cross rail silo system 207.

As illustrated in FIG. 1, the repository 208 is connected to the cross rail silo system 207, user device 204, and entity system 206. In other embodiments, the repository 208 may be a third party system separate from the entity system 206. The repository 208 has the same or similar components as described above with respect to the user device 204 and the entity system 206. While only one repository 208 is illustrated in FIG. 1, it is understood that multiple repository 208 may make up the system environment 200.

It is understood that the servers, systems, and devices described herein illustrate one embodiment of the invention. It is further understood that one or more of the servers, systems, and devices can be combined in other embodiments and still function in the same or similar way as the embodiments described herein. The repository 208 may generally include a processing device communicably coupled to devices as a memory device, output devices, input devices, a network interface, a power source, one or more chips, and the like. The repository 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like. The memory device may store any of a number of applications or programs which comprise computer-executable instructions/code executed by the processing device to implement the functions of the repository 208 described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Entities typically offer a wide variety of services to assist individuals on a daily basis. In providing these services, the entities manage a vast amount of data flowing through their technology environment. Advances in technology has made possible the use of digital platforms to deliver an increasing range and volume of services, which often carries significant cost savings as well as providing a potential entry point into the industry for recipients. For example, in a financial industry, traditional banking activities and programs that were only available to customers when physically inside a bank branch has been digitized (moved online). Activities like money deposits, withdrawals, and transfers, checking/saving account management, applying for financial products, loan management, bill pay, account services, or the like have been digitized enabling customer access at all times.

To battle this intrusion, entities typically employ multiple exposure identification teams. However, in large organizations with a technology environment spanning multiple geographic locations, the various exposure identification teams operate in individual silos lacking the coordination and control required to maximize the identification and quarantine of potential authorized intrusions. Each team implements its own exposure identification strategy using individual exposure detection systems unique to its purpose. In this regard, each team looks for specific target points and indicators for exposure within their detections system. To this extent, these detections systems may be configured to identify indicators that indicate a possible exposure and raise a "red-flag" if the exposure raises to a level that requires additional review. However, an exposure detected in one team may also be an applicable exposure in another team. In some cases, the lack of coordination between these teams within the entity may cause one team to potentially miss an indicator when not received directly by the detection system of that team, but received by the detection system of other teams.

The present invention provides a functional benefit of enabling individual detections systems within each exposure identification teams to communicate and coordinate more efficiently to detect potential unauthorized intrusions.

The invention creates a repository for exposure strategy teams for collective decision making on exposure identification and for distribution and sharing of data across team rails. Currently the various exposure strategy teams are in individual silos, such that they do not communicate across teams to identify exposure. Each team carries out their exposure prevention strategy using their own systems and software that do not interact with each other. Exposure strategy teams such as account takeover teams, digital authentication teams, transactional strategy teams, and the like each look at specific target points and indicators for exposure in each individual space using their own systems. The invention system allows for these teams to integrate data across rails and silos for exposure identification. The data may be added in real-time or near real-time using analytics. The data may be specific events and be linked via a specific taxonomy overlay. For example, while one team may see one or more indicators of exposure from an event, the event may not trigger an exposure identification/response/alert. However, the system may link and share data across the rails for the various teams that when the indicators are combined in an aggregate with other team indicators, exposure decision could be triggered. Furthermore the system also includes logic that, when identification of a potential indicate occurs, the system may communicate that indicator to other teams for the integration and sharing of potential data for cross entity exposure identification. Finally, the system is designed as a centralized repository in a hub-and-spoke manner. However, the system may be able to become un-centralized if necessary to communicate with a single team or node. In this way, the repository allows for data storage and access across teams, a logic to push out data for review, and an aggregation of events for exposure identification. The repository may exist across entities such that accounts from different banks are also being monitored.

FIG. 2A illustrates a silo network environment 550, in accordance with one embodiment of the present invention. In a traditional exposure event mitigation networking, each node or channel of the entity in exposure event mitigation acts independently of each other and are not able to communicate with each other. As such, they are currently structured in a silo system where each is individualized without an ability to communicate with each other for exposure identification and mitigation.

FIG. 2B illustrates an across rail silo environment 500, in accordance with one embodiment of the present invention. As illustrated in FIG. 2B a centralized database architecture comprises multiple nodes or channels from one or more sources and converge into a centralized database via a cross channel communication linkage generated via the system. As such, the channels for resource distribution may communicate information across various channels for resource distribution and deployment. The system, in this embodiment, may generate a single centralized data repository and communication linkage between the various nodes.

FIG. 3 illustrates an intrusion detection system model 300, in accordance with an embodiment of the invention. As shown in FIG. 3, each detections system 302 may be configured to look for and identify indicators within the parameters specific to its exposure identification teams. In some embodiments, a detection system is a user device 204, combination of user devices, or the like. In some embodiments, each detection system 302 may be configured to transmit each identified exposure event to be stored in a central repository 208 associated with the cross rail silo system 207. In one aspect, the central repository 208 may be configured to establish a communication link with each of the one or more detection systems 302 capable of transmitting and receiving information.

In some embodiments, every exposure event detected by the detection systems 302 may be stored on the central repository 208. While most of the exposure events may, by themselves, not raise to the level of a red-flag, the present invention provides the functional benefit of implementing an analytical machine learning model to process these exposure events to determine whether any combination of exposure events raise to the level of a red-flag. In doing so, the present invention also enables a retraining of the machine learning algorithm used to determine whether each exposure event (or a combination thereof) raises to the level of a red-flag.

In some embodiments, each detection system 302 is connected to the central repository 208 in a passive manner. Each time a detection system identifies an exposure event, the system may be configured to transform the passive connection between the detection system 302 and the central repository 208 into an active connection, thereby enabling the transmission of data from the detection system 302 to the central repository 208. In this regard, the system may be configured to receive a request to connect to the data channel established between the each of the one or more detection systems 302 and the centralized data repository 208, wherein the one or more detection systems 302 are previously disconnected from the centralized data repository 208. Here, the detection systems 302 connect to the data channel based on at least an incidence of an exposure event in the detection system 302. In response, the system may be configured to connect the one or more detection systems to the centralized data repository 208. In some other embodiments, each detection system 302 is connected to the central repository 208 in an active manner. In this regard, the connection between the central repository 208 and the detection system 302 remains active at all times, capable of data transmission and reception.

FIG. 4 illustrates a process flow for a system for aggregating user event record cross multiple platforms in a technology environment 400, in accordance with an embodiment of the invention. As shown in block 402, the process flow includes receiving an indication that at least one detection system has detected an exposure event. In one aspect, the indication is received via a network of distributed servers that are a part of the technology computing architecture, in which the entity's infrastructure resources are divided over a number of networks, processors, and intermediary devices. In this regard, the infrastructure resources include one or more network management software, which manages and monitors data routing, combining, and allocating network bandwidth, access control, and other core networking processes.

In some embodiments, an exposure event may indicate an unrecognized access to a network, system, application, or other resource. In one aspect, each exposure event comprises a score that is generated and assigned by a machine learning algorithm. In this regard, the system may be configured to use historical exposure events generate a score for the exposure event detected by the detection system. In some embodiments, the system may be configured to determine a level of exposure associated with each exposure event and its contribution to the overall intrusion when combined with one or more other exposure events raising the overall level of exposure to a red-flag and/or potential intrusions. By way of one example, training sets for use in machine learning processing can be created from exposure events that have been deemed to be potential intrusions in the past and exposure events that have been deemed to not be potential intrusions. In addition, the machine learning algorithm may incorporate the number of times and/or frequency with which the exposure events have been determined to be potential intrusions.

The machine learning/modeling techniques used herein may include but are not limited to linear regression, logistic regression, neural networks, support vector machines, decision trees, and their derivatives. In practice, one technique can be used in the research effort to provide insights for another machine learning/modeling technique. Thus, a combination of techniques can be used in the analysis and in the product implementation. Once the machine learning algorithm/modeling structure and method is determined, the algorithm is trained based on the historical exposure events adaptively. The parameters of the algorithm "learn" or automatically adjust to behavioral patterns in the historical data and generalize these patterns for detection purposes. When a new exposure event is scored, the algorithm typically generates a score to evaluate the exposure event and associated potential intrusion based on what it has learned in its training history. The algorithmic structure and technique used for this purpose may be adjusted in the training process recursively. The listing of machine learning/modeling structures and techniques listed herein are not exhaustive. Those skilled in the art will appreciate that other predictive modeling structures and techniques may be used in various embodiments. Example predictive modeling structures and techniques may include genetic algorithms, hidden Markov models, self-organizing maps, and dynamic Bayesian analysis.

Next, the process flow includes determining whether the detected exposure event meets the threshold level indicating a potential intrusion, as shown in block 404. In some embodiments, the scores associated with each exposure event may be compared to a predetermined score associated with a threshold level to determine whether the detected exposure event meets the threshold level of a red-flag. In one aspect, the detected exposure event, individually, may be determined to meet the threshold level of a red-flag. In another aspect, the detected exposure, individually, may not be determined to meet the threshold level of a red-flag. In some embodiments, the score required to meet the threshold level of a red-flag may be generated by the machine learning algorithm based on historical occurrences of potential intrusions by same or similar exposure events. In some other embodiments, the score required to meet the threshold level of a red-flag may be assigned by a user. In yet another embodiment, the score required to meet the threshold level of a red-flag may be generated based on a combination of the machine learning algorithm and user input.

Next, as illustrated in block 406 the process 400 continues by transferring the exposure event from a database associated with the detection system to a centralized repository, as shown in block 406. As described herein, the centralized repository or repository, such as the repository 208, may be operatively and selectively connected to the detection systems. Each time a detection system encounters an exposure event, the system may be configured to enable the detection system to transmit information associated with the exposure event. In one aspect, the information associated with the exposure event may include a category associated with the exposure event. For example, if the exposure event includes an incoming telephone call from an alleged customer who provided wrong identification information, the exposure event may be categorized under "incorrect authentication credentials." In another aspect, the exposure event may be categorized into multiple categories simultaneously. In the previous example, the exposure event may be categorized into "incorrect authentication credentials" and "incoming phone call."

In some embodiments, the categories may be predetermined in an attempt to provide consistency among various exposure events. In one aspect, the categories may be generated dynamically within each detection system and included in the information transmitted to the central repository. In this way, when the central repository receives the information, the system may be configured to reconcile the exposure events based on the received categories. In this regard, the system may be configured to determine whether previous received exposure events received from the detection systems are more applicably categorized into the category of the recently received exposure event. In another embodiment, the system may be configured to determine whether the recently received exposure event is more applicably categorized into other categories associated with previously received exposure events. In response, the system may be configured to re-categorize the exposure event accordingly. In some embodiments, the system may be configured to categorize the exposure event as they are received by the detection system. In another embodiment, the system may be configured to categorize the event in the central repository once the information associated with the exposure event has been received.

Next, as illustrated in block 408, the process 400 continues by executing applications for reviewing a combination of exposure events from the repository to identify potential intrusion levels. As such, the system deploys statistical algorithms to determine whether any combination of exposure events stored in the centralized data repository meets the threshold level of a red-flag indicating a potential intrusion. In some embodiments, the system may be configured to determine whether any combination of exposure events categorized under the same category meets the threshold level of a red-flag indicating a potential intrusion. In some other embodiments, the system may be configured to determine whether any combination of exposure events across multiple categories meets the threshold level of a red-flag indicating a potential intrusion. In one aspect, the system may be configured to execute the statistical algorithms on the one or more exposure events stored in the centralized repository continuously to determine whether the combination of at least a portion of the one or more exposure events is associated with the intrusion. In another aspect, the system may be configured to execute the statistical algorithms on the one or more exposure events stored in the centralized repository periodically.

In some embodiments, the system may be configured to store the information associated with the exposure events in the centralized data repository until a pattern associated with a potential intrusion is detection. In this regard, the information associated with the exposure events may be stored in the centralized repository until the statistical algorithms detect a combination of exposure events meeting the threshold level of a red-flag that includes the exposure events.

In some embodiments, the system may be configured to combine the scores associated with the exposure events stored in the centralized repository to determine whether the exposure events, in combination, meet the threshold level of a red-flag. In one aspect, each detection system may employ a system specific taxonomy to generate a score for each received exposure event. In this regard, the system may be configured to normalize or standardize the scores received from the detection systems prior to aggregating them to adjust values measured on different scales to a notionally common scale.

In some embodiments, the system may be configured to implement statistical algorithms, i.e., a set of heuristics and calculations to create a model from the exposure events stored in the central repository. In this regard, the system may be configured to analyze the exposure events to identify specific types of patterns or trends in the exposure events to determine whether any combination of the exposure events raise to meet the level of a red-flag. In some embodiments, the system may be configured to use the results of this analysis over multiple iterations to find the optimal parameters for creating a model. These parameters are then applied across the all the exposure events to extract actionable patterns and detailed statistics. In one aspect, the parameters used to create the model may include, but are not limited to individual scores associated with the exposure event, the one or more categories associated with the exposure event, the frequency of incidence of the exposure events, and/or the like. In some embodiments, the statistical algorithm may include, but is not limited to classification algorithms, regression algorithms, segmentation algorithms, association algorithms, sequence analysis algorithms, and/or the like. The listing of statistical algorithms and techniques listed herein are not exhaustive. Those skilled in the art will appreciate that other statistical algorithms and techniques may be used in various embodiments.

Next, as shown in block 410, the process flow includes transmitting the combination of exposure events that meet the threshold level of the red-flag to a user computing device for additional review. In one aspect, the user computing system may be at least one of the one or more detection systems. In one aspect, the system may be configured to initiate a presentation of a graphical user interface for display on the one or more detection systems. In this regard, the graphical user interface may include information associated with the combination of exposure events that met the threshold level of a red-flag. In some embodiments, the one or more detection system may be the detection systems that initially detected the individual exposure events associated with the combination of exposure events. In some other embodiments, the system may be configured to initiate the presentation of the graphical user interface for display on all the detection systems connected to the central repository. In yet another embodiment, the system may be configured to initiate the presentation of the graphical user interface for display on a computing device independent of the detection systems.

In response, a user associated with the entity may view the notification to initiate an elevated review of the combination of exposure events to determine whether there is an actual intrusion. In some embodiments, the user may execute one or more assessment applications on the exposure events to determine whether any combination of the exposure events indicate an actual intrusion. In this regard, the system may be configured to move the one or more exposure events associated with the potential intrusion from the centralized data repository into a volatile memory location. Once moved, the system may then be configured to deploy the one or more assessment applications on the exposure events stored in the volatile memory location, whereby the assessment application are configured to execute scripts to determine whether the potential intrusion is an actual intrusion, i.e., benign or harmful. In some embodiments, determining whether any combination of the exposure events indicate an actual intrusion may involve manual intervention. In yet another embodiment, the system may be configured to determine whether any combination of the exposure events indicate an actual intrusion may involve a combination of results from the assessment applications and manual input from the user. After further analysis, the system may be configured to receive an indication as to whether the combination of exposure events that meet the threshold level of a red-flag are actual intrusions.

FIG. 5 illustrates a process flow for generation of the across rail silo system integration for exposure event identification 100, in accordance with an embodiment of the invention. As illustrated in block 102, the process 100 continues by identifying devices across an entity system that are associated with exposure event identification. The devices may be user devices, servers, or the like found across the entity. The devices may be associated with strategy teams across the entity such as those associated with account takeover teams, digital authentication teams, transactional strategy teams, and the like.

As illustrated in block 104, the process 100 continues by identifying applications used by devices and teams for exposure identification. Currently the various exposure strategy teams are in individual silos, such they do not communicate across teams to identify exposure. Each team carries out their exposure prevention strategy using their own systems and software that do not interact with each other. Exposure strategy teams such as account takeover teams, digital authentication teams, transactional strategy teams, and the like each look at specific target points and indicators for exposure in each individual space using their own systems. This invention identifies the applications these exposure strategy teams utilize for generation of across rail soli system integration.

Next, as illustrated in block 106, the process 100 continues by generating communication linkage with the devices associated with the various strategy teams with the system to generate a centralized system for integration and logic repository for exposures in a unified hub-and-spoke repository.

As illustrated in block 108, the system 100 continues by integration into the various strategy team applications for real-time data communication from the devices of exposure events and subsequent storage of the communicated exposure events. In this way, the invention allows for real-time communication of potential exposure events, whether those events escalate to red-flagged events or potential intrusions mitigation responses, the events are transmitted to the centralized repository for storage from across strategy teams.

Next, the system may aggregate and link, via taxonomy overlay the exposure events from the devices into the centralized repository, as illustrated in block 110. The taxonomy overlay allows for events from various strategy teams to be overlaid relative to entity exposure policies to identify increased exposure related to the combination of one or more exposure events in combination.

As illustrated in block 112, the process 100 is completed by generation of a fluid environment for centralized repository storage of exposure events with communication channels across the entity system while maintaining a single node strategy team communication capability.

FIG. 6 illustrates a process flow illustrating taxonomy overlay of one or more exposure events 600, in accordance with an embodiment of the invention. As illustrated in block 602, the process 600 is initiated by receiving the exposure event data from one or more devices across an entity that do not necessarily trigger a mitigation response. In some embodiments, the exposure event data on its own does trigger a mitigation response or red-flag. In other embodiments, the exposure event data does trigger a mitigation response on its own.

Next, as illustrated in block 604, the process 600 continues by performing a taxonomy overlay of the exposure event data for aggregation and linkage of the data. In this way, the system may overlay exposure events from one or more strategy teams to identify further red-flags and/or mitigation requirements for combinations of exposure events from across the various strategy teams.

As illustrated in block 606, the process 600 continues to identify one or more exposure events that are combined to trigger a threshold potential intrusion and/or mitigation response. In this way, while one or more exposure events may not trigger a threshold on their own individually, the combination of one or more exposure events may trigger the threshold event for the entity. While the single events from various strategy teams may not trigger a threshold, the combination of more than one event from the various different strategy teams may trigger the threshold for the entity.

Finally, as illustrated in block 608, the process 600 is completed by triggering logic communication to devices associated with the one or more exposure events that triggered the threshold for communication of the combination of events requiring a mitigation response from the one or more strategy teams.

le;2qAs will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 8050US1.014033.3089 | 15/798,159 published as U.S. patent Publication No. 2019/0130098 | CROSS PLATFORM USER EVENT RECORD AGGREGATION SYSTEM | Concurrently herewith |
| 8052US1.014033.3091 | 15/798,163 published as U.S. patent Publication No. 2019/0132328 | CROSS CHANNEL AUTHENTICATION ELEVATION VIA LOGIC REPOSITORY | Concurrently herewith |

What is claimed is:

1. A system for across silo system integration, the system comprising:
a memory device with computer-readable program code stored thereon;
a communication device;
a processing device operatively coupled to the memory device and the communication device, wherein the processing device is configured to execute the computer-readable program code to:
- identify one or more devices across an entity network, wherein the one or more devices are associated with exposure strategy users identifying exposure events within the entity;
- generate a communication linkage with the one or more devices and a centralized repository for exposure event storage;
- receive one or more exposure events from the one or more devices;
- transmit information associated with the one or more exposure events to the centralized repository via selective connectivity communication linkage;
- identify that the one or more exposure events does not reach a threshold level of a red-flag exposure event;
- aggregate the transmitted information associated with the one or more exposure events received within the centralized repository across multiple categories of exposure events to identify a combination of exposure events indicating a potential intrusion, wherein the combination of exposure events include at least a portion of each of the one or more exposure events;
- perform a taxonomy overlay of the aggregated one or more exposure events, wherein the taxonomy overlay identifies a combination of one or more exposure events across strategy teams within an entity to identify exposure of intrusion to the entity;
- trigger a mitigation response from the entity as opposed to from each strategy team based on the combination of the exposure events reaching the threshold level of the red-flag exposure event; and
- transmit via a secure single node strategy team communication the combination of one or more exposure events from the mitigation response while maintaining a fluid environment for centralized repository storage of the one or more exposure events with communication channels across an entity.

2. The system of claim 1, wherein generating a communication linkage with the one or more devices and a centralized repository for exposure event storage further comprises generating communication linkage with the one or more devices and maintain single node communication compatibility.

3. The system of claim 1, wherein receiving one or more exposure events from the one or more devices via the communication linkage further comprises integrating into applications on the one or more devices and extracting identified exposure events.

4. The system of claim 1, wherein the exposure events comprise one or more intrusions associated with a department within the entity, wherein the one or more intrusions include benign intrusions or require a mitigation response based on a review.

5. The system of claim 1, wherein the taxonomy overlay identifies a combination of one or more exposure events triggering a mitigation response further comprises combining one or more exposure events that are benign to generate a combination of multiple exposure events that trigger, in combination, the mitigation response requirement.

6. The system of claim 1, wherein transmitting via single node communication the combination of one or more exposure events from the mitigation response further comprises communicating directly to specific devices associated with exposure strategy users for performing the mitigation response via a single node communication while maintaining the centralized repository and the communication linkage with the one or more devices across the entity.

7. The system of claim 1, wherein transmitting via single node communication the combination of one or more exposure events from the mitigation response further comprises triggering logic communication to the device associated with the one or more exposure events identified in the combination.

8. A computer program product for across silo system integration, the computer program product comprising at least one non-transitory computer-readable medium having computer-readable program code portions embodied therein, the computer-readable program code portions comprising:
- an executable portion configured for identifying one or more devices across an entity network, wherein the one or more devices are associated with exposure strategy users identifying exposure events within the entity;
- an executable portion configured for generating a communication linkage with the one or more devices and a centralized repository for exposure event storage;
- an executable portion configured for receiving one or more exposure events from the one or more devices;
- an executable portion configured for transmitting information associated with the one or more exposure events to the centralized repository via selective connectivity communication linkage;
- an executable portion configured for identifying that the one or more exposure events does not reach a threshold level of a red-flag exposure event;
- an executable portion configured for aggregating the transmitted information associated with the one or more exposure events received within the centralized repository across multiple categories of exposure events to identify a combination of exposure events indicating a potential intrusion, wherein the combination of exposure events include at least a portion of each of the one or more exposure events;
- an executable portion configured for performing a taxonomy overlay of the aggregated one or more exposure events, wherein the taxonomy overlay identifies a combination of one or more exposure events across strategy teams within an entity to identify exposure of intrusion to the entity;
- an executable portion configured for triggering a mitigation response from the entity as opposed to from each strategy team based on the combination of the exposure events reaching the threshold level of the red-flag exposure event; and
- an executable portion configured for transmitting via a secure single node strategy team communication the combination of one or more exposure events from the mitigation response while maintaining a fluid environment for centralized repository storage of the one or more exposure events with communication channels across an entity.

9. The computer program product of claim 8, wherein generating a communication linkage with the one or more devices and a centralized repository for exposure event storage further comprises generating communication linkage with the one or more devices and maintain single node communication compatibility.

10. The computer program product of claim 8, wherein receiving one or more exposure events from the one or more devices via the communication linkage further comprises integrating into applications on the one or more devices and extracting identified exposure events.

11. The computer program product of claim 8, wherein the exposure events comprise one or more intrusions associated with a department within the entity, wherein the one or more intrusions include benign intrusions or require a mitigation response based on a review.

12. The computer program product of claim 8, wherein the taxonomy overlay identifies a combination of one or more exposure events triggering a mitigation response further comprises combining one or more exposure events that are benign to generate a combination of multiple exposure events that trigger, in combination, the mitigation response requirement.

13. The computer program product of claim 8, wherein transmitting via single node communication the combination of one or more exposure events from the mitigation response further comprises communicating directly to specific devices associated with exposure strategy users for performing the mitigation response via a single node communication while maintaining the centralized repository and the communication linkage with the one or more devices across the entity.

14. The computer program product of claim 8, wherein transmitting via single node communication the combination of one or more exposure events from the mitigation response further comprises triggering logic communication to the device associated with the one or more exposure events identified in the combination.

15. A computer-implemented method for across silo system integration, the method comprising:
   providing a computing system comprising a computer processing device and a non-transitory computer readable medium, where the computer readable medium comprises configured computer program instruction code, such that when said instruction code is operated by said computer processing device, said computer processing device performs the following operations:
      identifying one or more devices across an entity network, wherein the one or more devices are associated with exposure strategy users identifying exposure events within the entity;
      generating a communication linkage with the one or more devices and a centralized repository for exposure event storage;
      receiving one or more exposure events from the one or more devices;
      transmitting information associated with the one or more exposure events to the centralized repository via selective connectivity communication linkage;
      identifying that the one or more exposure events does not reach a threshold level of a red-flag exposure event;
      aggregating the transmitted information associated with the one or more exposure events received within the centralized repository across multiple categories of exposure events to identify a combination of exposure events indicating a potential intrusion, wherein the combination of exposure events include at least a portion of each of the one or more exposure events;
      performing a taxonomy overlay of the aggregated one or more exposure events, wherein the taxonomy overlay identifies a combination of one or more exposure events across strategy teams within an entity to identify exposure of intrusion to the entity;
      triggering a mitigation response from the entity as opposed to from each strategy team based on the combination of the exposure events reaching the threshold level of the red-flag exposure event; and
      transmitting via a secure single node strategy team communication the combination of one or more exposure events from the mitigation response while maintaining a fluid environment for centralized repository storage of the one or more exposure events with communication channels across an entity.

16. The computer-implemented method of claim 15, wherein generating a communication linkage with the one or more devices and a centralized repository for exposure event storage further comprises generating communication linkage with the one or more devices and maintain single node communication compatibility.

17. The computer-implemented method of claim 15, wherein receiving one or more exposure events from the one or more devices via the communication linkage further comprises integrating into applications on the one or more devices and extracting identified exposure events.

18. The computer-implemented method of claim 15, wherein the taxonomy overlay identifies a combination of one or more exposure events triggering a mitigation response further comprises combining one or more exposure events that are benign to generate a combination of multiple exposure events that trigger, in combination, the mitigation response requirement.

19. The computer-implemented method of claim 15, wherein transmitting via single node communication the combination of one or more exposure events from the mitigation response further comprises communicating directly to specific devices associated with exposure strategy users for performing the mitigation response via a single node communication while maintaining the centralized repository and the communication linkage with the one or more devices across the entity.

20. The computer-implemented method of claim 15, wherein transmitting via single node communication the combination of one or more exposure events from the mitigation response further comprises triggering logic communication to the device associated with the one or more exposure events identified in the combination.

* * * * *